United States Patent
Henry et al.

(10) Patent No.: US 8,684,103 B2
(45) Date of Patent: Apr. 1, 2014

(54) UNIVERSAL SWEEP PLOW ATTACHMENT

(75) Inventors: Jim Henry, Saskatoon (CA); Blake Neudorf, Warman (CA); Dave Wiebe, Warman (CA)

(73) Assignee: CNH Canada, Ltd., Saskatoon, Saskatchewan (CA)

( * ) Notice: Subject to any disclaimer, the term of this patent is extended or adjusted under 35 U.S.C. 154(b) by 123 days.

(21) Appl. No.: 12/328,278

(22) Filed: Dec. 4, 2008

(65) Prior Publication Data

US 2010/0139938 A1   Jun. 10, 2010

(51) Int. Cl.
*A01B 39/20*   (2006.01)

(52) U.S. Cl.
USPC ........... 172/724; 172/719; 172/720; 172/699; 111/152

(58) Field of Classification Search
USPC ......... 172/719, 720–722, 724, 730, 733, 766, 172/772, 772.5, 773, 700, 140, 146, 271, 172/196; 111/109, 149, 152, 123–126, 140, 111/148
See application file for complete search history.

(56) References Cited

U.S. PATENT DOCUMENTS

| | | | | |
|---|---|---|---|---|
| 184,171 A * | 11/1876 | Porter | | 172/700 |
| 185,073 A * | 12/1876 | Buhoup | | 172/724 |
| 310,333 A * | 1/1885 | Terrell | | 172/722 |
| 346,064 A | 7/1886 | Potts | | |
| 373,829 A * | 11/1887 | Hatcher | | 172/722 |
| 418,389 A * | 12/1889 | Stephens | | 172/722 |
| 475,461 A * | 5/1892 | Miller | | 172/722 |
| 504,375 A * | 9/1893 | Terrell | | 172/733 |
| 641,595 A * | 1/1900 | Hunt | | 172/194 |
| 774,324 A | 11/1904 | Hill et al. | | |
| 788,137 A * | 4/1905 | Huxford | | 172/724 |
| 948,210 A * | 2/1910 | Evans | | 172/722 |
| 1,099,765 A | 6/1914 | Poole | | |
| 1,124,120 A * | 1/1915 | Folsom | | 172/733 |
| 1,130,489 A * | 3/1915 | Dean | | 172/733 |
| 1,230,686 A * | 6/1917 | Dixon | | 172/722 |
| 1,324,902 A * | 12/1919 | Kelly | | 172/722 |
| 1,639,593 A * | 8/1927 | Dean | | 172/733 |
| 2,051,328 A * | 8/1936 | Christensen | | 172/719 |
| 2,062,197 A * | 11/1936 | Thompson | | 172/722 |
| 2,337,777 A * | 12/1943 | Seaholm | | 172/722 |
| 2,657,652 A * | 11/1953 | Graham | | 111/64 |
| 3,085,635 A * | 4/1963 | Livermore | | 172/699 |
| 3,180,430 A * | 4/1965 | Launder et al. | | 172/700 |
| 4,185,699 A * | 1/1980 | Lewison | | 172/724 |
| 4,245,706 A * | 1/1981 | Dietrich, Sr. | | 172/180 |
| 4,674,419 A | 6/1987 | Kopecky | | |

(Continued)

FOREIGN PATENT DOCUMENTS

FR   2 701 805 A1   9/1994

*Primary Examiner* — Matthew D Troutman
(74) *Attorney, Agent, or Firm* — Rebecca L. Henkel; Sue C. Watson

(57) ABSTRACT

A universal sweep plow configured to mate securely and be attached to a seed boot. The universal sweep plow includes sweep plow attachment formed from a single unit of metal and an anchor. The attachment includes a central portion configured to mate with a seed boot and right and left central portion openings configured to align with an anchor hole in the seed boot. The right and left wing portions extend outward and rearward from the central portion. The anchor is configured to attach the sweep plow to the seed boot by passing through the right and left central portion openings and the anchor hole in the seed boot.

23 Claims, 4 Drawing Sheets

(56) References Cited

U.S. PATENT DOCUMENTS

| | | | |
|---|---|---|---|
| 4,773,340 A * | 9/1988 | Williams et al. | 111/124 |
| 4,825,782 A * | 5/1989 | Mikkelsen | 111/123 |
| 5,001,995 A | 3/1991 | Mikkelsen | |
| 5,314,029 A * | 5/1994 | Rowlett | 172/699 |
| 5,499,686 A * | 3/1996 | Parker | 172/730 |
| 5,605,196 A | 2/1997 | Grimm et al. | |
| 5,730,228 A * | 3/1998 | Mansur | 172/722 |
| 5,881,821 A * | 3/1999 | Noonan et al. | 172/762 |
| 5,941,318 A | 8/1999 | Bergen | |
| 6,059,047 A * | 5/2000 | Schimke | 172/769 |
| 6,405,665 B1 | 6/2002 | Henry et al. | |
| 6,443,237 B1 * | 9/2002 | Myers et al. | 172/730 |
| 6,745,709 B2 * | 6/2004 | Rowlett et al. | 111/152 |
| 6,986,314 B2 | 1/2006 | Linnebur et al. | |
| 7,055,619 B2 * | 6/2006 | Linnebur et al. | 172/772.5 |
| 7,096,803 B2 | 8/2006 | Bergen | |
| 7,104,341 B2 * | 9/2006 | Steinlage et al. | 172/730 |
| 7,588,091 B1 * | 9/2009 | Neudorf et al. | 172/773 |
| 2005/0160954 A1 * | 7/2005 | Linnebur et al. | 111/152 |
| 2005/0172871 A1 * | 8/2005 | Linnebur et al. | 111/156 |
| 2005/0252668 A1 * | 11/2005 | Poutre | 172/724 |

* cited by examiner

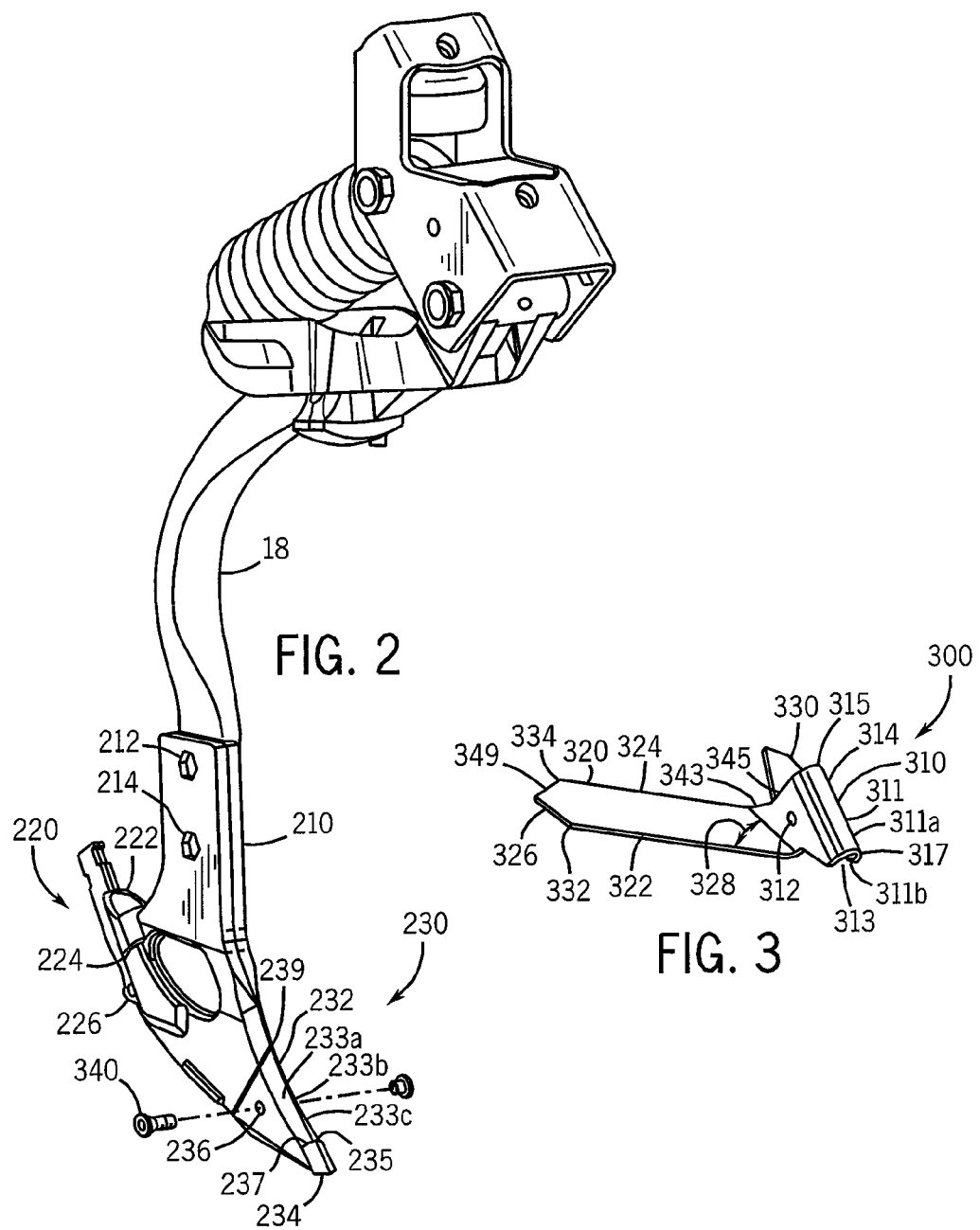

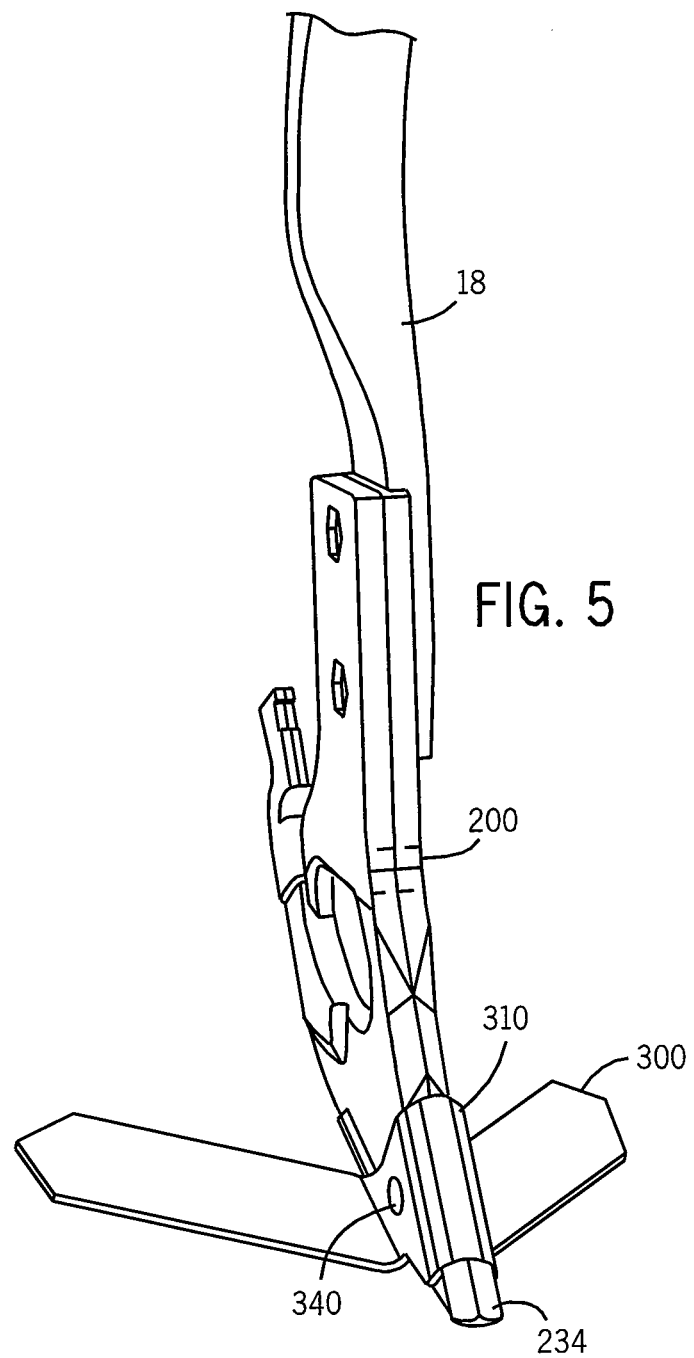

UNIVERSAL SWEEP PLOW ATTACHMENT

FIELD OF THE INVENTION

The present invention relates generally to a sweep plow for use in an agricultural setting that is configured to pass under a large amount of soil and cut roots of unwanted plants between crop rows, and in particular, to an agricultural sweep configured to be removably attached to a seed distribution apparatus.

BACKGROUND OF THE INVENTION

Modern row crop planters or seed planters include multiple seed planting implements attached to a toolbar and towed behind a tractor or other agricultural vehicle. Each of the row planting implements is responsible for opening a seed trench or furrow, dispensing the seeds into the furrow, and closing the furrow after the seeds are planted.

A typical method for planting seeds includes using a seed boot with a type of ground engaging tool attached thereto. Seeding requires depositing seeds and fertilizer into a v-shaped furrow formed in the soil. The seed boot may be used to create and maintain the furrow to ensure that the seed and the fertilizer are deposited within the v-shaped furrow at the proper depth. Seed boots often include a ground engaging tip having narrow extensions configured to maintain the seed boot within the formed furrow. Multiple seed boots may be attached to the tool bar in a configuration that matches desired rows of planting. The tool bar may be towed behind an agricultural vehicle across fields being planted.

The tool bar that is dragged behind the agricultural vehicle may further be adapted for additional functions. One such function includes weed killing along the seed planting row. One method of weed killing includes using an agricultural sweep plow to cut off weeds below soil level.

An agricultural sweep or sweep plow is a type of plow designed to remove unwanted weeds and other grass from the center of row crops. The sweep plow is traditionally a toolbar implement of great rigidity that pulls a wide, flat blade just beneath the surface. The sweep plow is designed to kill weeds without disturbing surface residue which is desirable since disturbing the surface residue may introduce weed seed into the soil. The sweep plow may also be referred to as a blade plow, a Noble blade plow, a wide-blade plow, or a V-blade plow.

Sweep plows and seed boots are generally implemented as independent, dedicated tools and are typically mounted by bolted connection to a tool bar shank. However, it is often necessary to changeover the independent, dedicated tools that are mounted to the tool bar shank, for example, to replace a seed boot tool with a sweep plow tool. The bolted connection mounting requires the removal of bolts (which are prone to wear and corrosion) incurring a potentially significant changeover time. Additionally, independent, dedicated tools require an operator to purchase multiple, potentially expensive, devices to provide the different functions, such as seeding and sweep plowing.

Thus, there exists a need for a universal sweep plow configured to be quickly mountable onto a seed boot such that an operator can change from a seeding operation to a tillage operation with a minimal amount of changeover of ground tools. What is further needed is such a sweep configured to minimize surface soil disturbance during the sweep operation.

SUMMARY OF THE INVENTION

The present invention is directed to a universal sweep plow configured to mate securely and be attached to a seed boot. The universal sweep plow includes sweep plow attachment formed from a single unit of metal and an anchor. The attachment includes a central portion configured to mate with a seed boot and right and left central portion openings configured to align with an anchor hole in the seed boot. The right and left wing portions extend outward and rearward from the central portion. The anchor is configured to attach the sweep plow to the seed boot by passing through the right and left central portion openings and the anchor hole in the seed boot.

According to an exemplary embodiment of the invention, the central portion is configured such that, when the central portion is anchored to the seed boot, the wing portions extend outward horizontally from the central portion. Further, the front edge of each wing is relatively lower than a rear edge of each wing within the horizontal plane such that the sweep plow will act as a soil engagement mechanism during operation. The thickness of the central portion may also be reduced relative to the thickness of the wings.

According to another embodiment, the thickness of each wing is greater in a wing portion close to the central portion relative to the thickness in a wing portion removed from the central portion. The thickness of the central portion may be configured to match the thickness of a trailing edge of a seed boot point such that the seed boot point and central portion present a flush surface when the sweep plow is attached to the seed boot.

According to yet another exemplary embodiment, an inside surface of the central portion is configured to match a leading edge of the seed boot.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings:

FIG. 2 is an exemplary seed boot configured to be mounted to a tool shank as described above with reference to FIG. 1 and including a seed delivery system, according to an exemplary embodiment;

FIG. 3 is an isometric view of a universal sweep plow of unitary construction configured for attachment to a seed boot, according to an exemplary embodiment;

FIG. 5 is an isometric view of the seed boot of FIG. 2 having a universal sweep plow attached thereto, according to an exemplary embodiment; and;

DETAILED DESCRIPTION OF THE PREFERRED EMBODIMENTS

Figure 1:
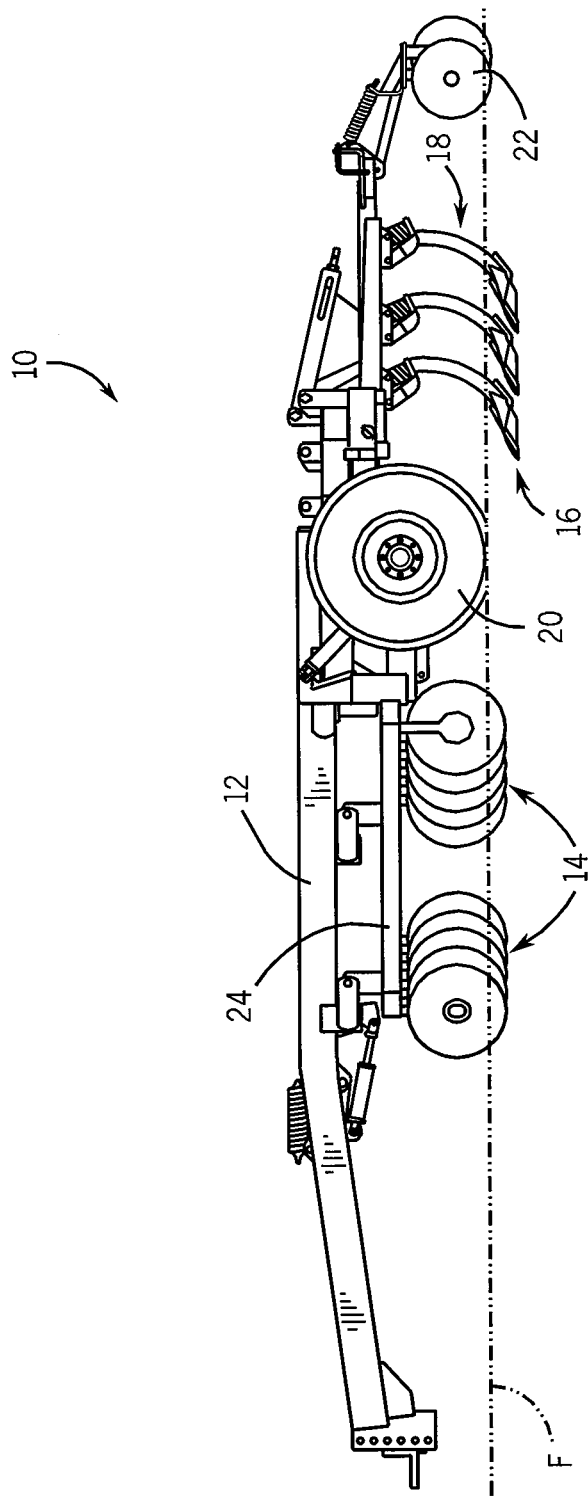
FIG. 1 is a side elevation view of an agricultural implement including a plurality of seed boots, according to an exemplary embodiment.

Referring now to FIG. 1, agricultural implement 10 is shown incorporating the universal sweep plow of the present invention. Agricultural implement 10 includes implement frame 12 that is towable by a tractor (not shown) or other vehicle as known in the art. In the depicted illustration, agricultural implement 10 is a combination implement capable of carrying two different kinds of agricultural tools, such as discs 14 and seed boots 16. As is conventional, seed boots 16 are coupled to shanks 18 that extend downwardly from the implement frame 12. Implement frame 12 is supported above the field F by wheel assembly 20. Rear disc assembly 22 is also pivotably mounted to the implement frame.

The two sets of discs 14 are coupled to the implement frame 12 by a disc frame 24. As known in the art, disc frame 24 can be raised and lowered relative to implement frame 12 to independently control the depth of discs 14. Similarly, as known in the art, seed boots 16 may be raised and lowered independent of the discs 14. Implement frame 12 may also be rotated over wheel assembly 20 to raise and lower implement frame 12. It is understood that the universal sweep plow of the present invention may be used in conjunction with other types of implement frames without deviating from the scope of the present invention.

Although seed boot 16 is shown operating in a cooperative manner with discs 14, it should be understood that seed boot 16 may alternatively be configured to include a furrowing component. The integrated furrowing component may be integrally formed or mounted upon seed boot 16 to perform the furrowing and closing functions described above. Further, although a plurality of seed boots 16 are shown operating in a cooperative manner, a single seed boot 16 mounted to a shank 18 may also be utilized.

Referring now to FIG. 2, an exemplary seed boot 200 configured to be mounted as seed boot 16 to tool shank 18 as described above with reference to FIG. 1 and including a seed delivery system 220 is shown. Although a particular implementation of a seed boot 200 is shown, it should be understood by one of ordinary skill in the art that any type and/or configuration of seed boot may be used.

According to an exemplary embodiment, seed boot 200 includes a tool shank attachment 210, a seed delivery system 220, and an earth penetration front end 230. Seed boot 200 may further include more, less, and/or a different configuration of components configured to perform the functions described herein. Tool shank attachment 210 can be any attachment for fastening seed boot 200 to a tool shank 18. According to one exemplary embodiment, as shown in FIG. 2, attachment 210 of seed boot 200 may include both a first fastening point 212 and a second fastening point 214. Each fastening point 212 and 214 may be configured to receive a bolt configured to pass through both the fastening point and shank 18 to secure seed boot 200 to shank 18. Other exemplary attachments may include either permanent attachment such as by welding, integral formation, etc. and/or temporary attachment such as by bolting, screwing, clipping, etc. seed boot 200 to shank 18.

Seed delivery system 220 includes a seed conduit aperture 222, a seed delivery aperture 224, and a seed dispersal attachment 226. Seed delivery system 220 is configured such that, when a seed delivery conduit, such as a tube, is attached to the seed conduit aperture 222, the seeds may be received by seed boot 200. Seed delivery system 220 is further configured to pass the seeds through seed delivery aperture 224 to the seed dispersal attachment 226 for introduction to the soil. Seed dispersal attachment 226 may be varied based on the type of seed delivery desired. For example, where wide seed dispersal is desirable, such as when multiple seeds are being introduced at any given time, seed dispersal attachment 226 may be generally convex and where narrow seed dispersal is desirable, such as when single seeds are being introduced at any given time, seed dispersal attachment 226 may be generally concave. Seed delivery system 220 may be positioned rearward of the earth penetration front end 230 such that seeds are introduced directly into the soil opened by the earth penetration front end 230. Seed delivery system 220 may also be positioned relative to the earth penetration front end 230 such that seed are introduced directly into the soil at a desired planting depth.

Earth penetration front end 230 is configured to move through soil while minimizing the disturbance of the soil cause by the passage of seed boot 200. Minimizing disturbance of the soil reduce the likelihood of introducing weed seeds that may be resting on top of the soil into the soil where it will be easier for the seeds to germinate and grow. Earth penetration front end 230 includes a leading edge 232, a seed boot point 234, and anchor hole 236 extending therethrough.

Leading edge 232 defines a portion of the seed boot that will first contact new topsoil as the seed boot 210 is dragged through the earth in an engaged position. Leading edge 232 of seed boot 200 may be configured to have a relatively narrow profile, such that the amount of soil disturbance caused by the passage of seed boot 210 is minimized. In the depicted embodiment, leading edge 232 may include a first angled face 233*a* and a second angled face 233*b* configured to project forward in converging angles from the body of seed boot 210 to define a knife edge 233*c*, particularly at a location along leading edge 232 where seed boot 200 will be passing through the topsoil layer of the earth.

Leading edge 232 may further be configured to define a shoulder 239 extending outward beyond knife edge 233*c*. Shoulder 239 may extend outward to match the width of universal sweep plow 300, hereinafter described, when sweep plow 300 is in an attached position, FIG. 5.

Seed boot point 234 may be a replaceable or permanently attached seed boot 200. Seed boot point 234 may be made of a particularly strong material to assist in deflecting rocks, roots, and other obstacles within the soil. Seed boot point 234 may include a trailing edge 235 that overlaps leading edge 232 such that a shoulder 237 is formed where trailing edge 235 meets leading edge 232, shown in greater detail below with reference to FIG. 6. Shoulder 237 may be configured to extend rearward from seed boot point 234 along leading edge 232. Shoulder 237 may be configured to extend over universal sweep plow 300 when sweep plow 300 is in an attached position as further described herein below.

Anchor hole 236 through seed boot 200 is adapted for receiving sweep plow anchor 340 therethrough, as hereinafter described. Anchor hole 236 may be preformed during manufacture of seed boot 200 or may be added subsequently. In addition, anchor hole 236 may be reinforced to prevent damage to seed boot 200 during operation of seed boot 200 with universal sweep plow 300 attached, as further described below.

Referring now to FIG. 3, an isometric view of a universal sweep plow in accordance with the present invention is generally designated by the reference numeral 300. It is contemplated for sweep plow 300 to be fabricated of unitary construction and be configured for attachment to a seed boot 200. Providing single unitary construction increases the stability of sweep plow 300 and reduces the amount of material that must be used in forming sweep plow 300 to achieve that stability. In addition, providing a single unitary construction further reduces structural weaknesses that are often associated with joinery points and reduces the need for additional materials to compensate for this weakness.

Sweep plow 300 includes center portion 310 configured to mate with seed boot 200, and left and right sweep wings 320 and 330, respectively. Sweep plow 300 may be configured such that right and left wings 320 and 330, respectively, diverge in a rearward angle from central portion 310 such that right and left wings 320 and 330, respectively, are substantially in a horizontal plane with respect to each other.

Central portion 310 is defined by sidewall 311 having a concave outer surface 311a and a concave inner surface 311b. Inner surface 311b of sidewall 311 defines a cavity 313 adapted for receiving leading edge 232 of seed boot 200. Cavity 313 may be particularly shaped to match the shape of leading edge 232 such that leading edge 232 nests securely within the central portion 310. More specifically, it is contemplated for inner surface 311b of sidewall 311 to be configured so as to mesh with the profile of the leading edge 232 of seed boot 200 defined by first angled face 233a, second angled face 233b, and edge 233c, as herein described. Sidewall 311 of central portion 310 is further defined by an upper edge 315 and a lower edge 317. Upper edge 315 of sidewall 311 abuts shoulder 239 of leading edge 232 with leading edge 232 received within cavity 313 of central portion 310. Similarly, lower edge 317 of sidewall 311 abuts shoulder 235 in seed boot point 234 with leading edge 232 received within cavity 313 of central portion 310. It can be appreciated that shoulders 235 and 239 in leading edge 232 and seed boot point 234, respectively, discourage pivotal movement of sweep plow 300 as sweep plow 300 is drawn through the earth.

Sidewall 311 of central portion 310 further includes right and left central portion openings 312, 314 that are alignable with anchor hole 236 in the seed boot 200. Bolt or other anchor 340 may be inserted completely through all of the right central portion opening 312, anchor hole 236, and the left central portion opening 316. Sweep plow anchor 340 has a terminal end 340a adapted for receiving nut 341 thereon. With nut 341 threaded on sweep plow anchor 340, it can be appreciated that sweep plow 300 is securely mounted to seed boot 200. Although a single attachment method and anchor location are shown and described, it should be understood that sweep plow 300 may be attached to seed boot 200 using any of a variety of know methods and at a one or more different and/or additional location to provide the benefits described herein.

Right and left wings 320 and 330, respectively, project outwardly from corresponding sides 345 and 343 of sidewall 311. Each of right and left wings 320 and 330, respectively, may be configured to be a mirror image of the other. As such, the description hereinafter of right wing 320 is understood to describe left wing 330 as if fully described herein. Right wing 320 is defined by leading edge 322 and trailing edge 324. Leading and trailing edges 322 and 324, respectively, of right wing 320 extend laterally from side 345 of sidewall 311 and are generally parallel to each other in a common plane. Terminal ends 332 and 334 of leading and trailing edges 322 and 324, respectively, of right wing 320 are interconnected by a generally v-shaped edge 349 defining wing tip 326. Right and left wings 320 and 330, respectively, may be horizontal extensions extending outwardly and to the rear of central portion 310. It is contemplated for the lengths of right and left wings 320 and 330, respectively, in combination with the width of central portion 310 to correlates to a desired planting row width.

Right wing 320 includes a wing front edge 322, a wing rear edge 324, a wing tip 326, and angle of incidence 328. Wing front edge 322 is configured to extend from central portion 311 to wing tip 326. Wing front edge 322 may extend from the lower edge 317 of central portion to the wing tip 326 or may extend from any portion of the central portion 311 between the lower edge 317 and upper edge 315. Wing rear edge 324 is similarly configured to extend from the central portion 311 to the wing tip 326. Wing rear edge 324 may extend from the upper edge 315 of central portion to the wingtip 326 or may extend from any portion of the central portion 311 between the lower edge 317 and upper edge 315, provided the wing front edge 322 attachment is displaced from the wing rear edge 324 attachment.

According to an exemplary embodiment, right and/or left wings 320 and 330, respectively, may be downwardly angled to a slight degree relative to a horizontal plane roughly defined by field F such that right and left wings 320 and 330, respectively, act as soil engaging members for seed boot 200. Accordingly, wing front edge 322 may be configured to be lower than wing rear edge 324 when sweep plow 300 is attached to seed boot 200 such that the angle of attack of sweep plow 300 pulls seed boot 200 downward and performs a soil engaging function.

According to another exemplary embodiment, wing front edge 322 may be configured to be thinner relative to wing rear edge 324 to increase the ability of sweep plow to cut through soil, weed roots, etc. while thickening towards rear edge 324 to provide additional structural rigidity. Other configurations, such as tapering both front edge 322 and rear edge 324 relative to a center portion of left wing 320 may also be implemented. In addition, wing tip 326 may be squared off such that the width between the wing tip 326 of right wing 320 and left wing 330 correlates to any of a variety of planting row widths.

Angle of incidence 328 defines the angle along an axis of each wing 320 and 330 relative to the angle of the axis of central portion 310. It is contemplated for angle of incidence 328 to be configured based on an anticipated soil type, likelihood of obstructions, etc. where a higher angle of incidence may be use in soft soil with less potential obstructions.

It is further contemplated for right and left wings 320 and 330, respectively, not to be mirrored. As such, each of right and left wings 320 and 330, respectively, may have differing configurations to match differing anticipated terrain profiles to be swept to the right and/or left of seed boot 200. For example, when using sweep plow 300 on a sloped terrain, right wing 320 may be configured to extend upward from the horizontal plane while left wing 330 extends downward from the horizontal plane.

Sweep plow anchor 340 may be any type of anchor configured to securely attach sweep plow 300 to seed boot 200. Examples may include a bolt, a rod, etc configured to pass through the right central portion opening 312, anchor hole 236, and the left central portion opening 314. Sweep plow anchor 340 may be held in place by a square nut, a cap screw, a roll pin, or any other anchor type. In addition, sweep plow anchor 340 is configured to be removable by a human operator, and yet, prevent disengagement of the sweep plow 300 during operation.

Figure 4:
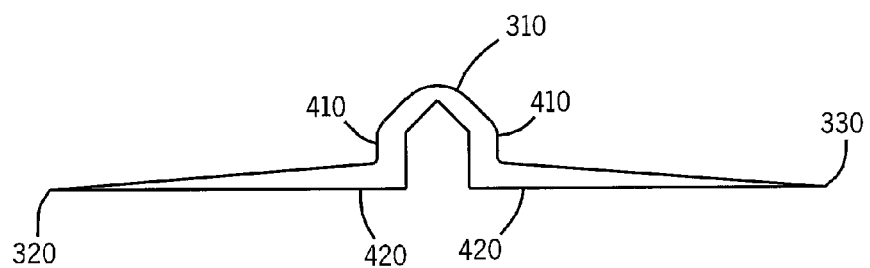
FIG. 4 is a cut away view of the sweep plow of FIG. 3, according to an exemplary embodiment.

Referring now to FIG. 4, a cut away view of sweep plow 300 is shown. Central portion 310 may be configured to have increased thickness in a wing attachment portion 410 at the junctions of central portion 310 with right and left wing 320 and 330, respectively, to provide additional rigidity and support for right and left wings 320 and 330, respectively. Right and left wings 320 and 330, respectively, may be configured to have increased thicknesses in proximate wing portions 420 proximate to central portion 310 to provide additional rigidity.

Referring now to FIG. 5, an isometric view of the seed boot 200 having the universal sweep plow 300 attached thereto is shown, according to an exemplary embodiment. As shown, sweep plow 300 tightly couples to seed boot 200 such that the overall thickness of seed boot 200 is not significantly increased by the attachment of sweep plow 300. Further, in the attached configuration, sweep plow 300 is positioned based on the angle of leading edge 232 such that sweep plow 300 will act as a soil engaging member for seed boot 200.

Figure 6:
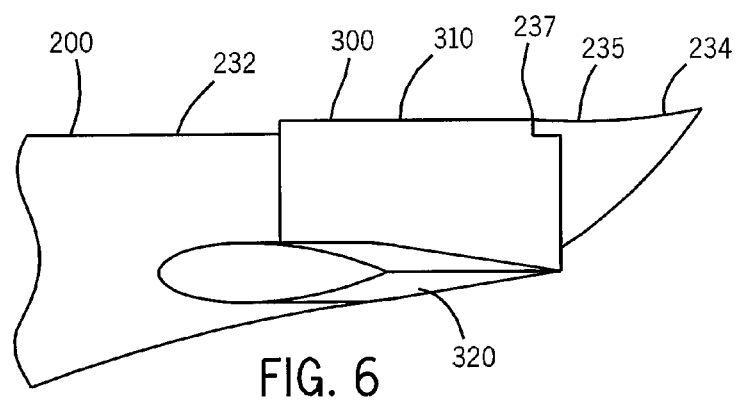
FIG. 6 is a transverse view of a sweep plow attached to a seed boot, according to an exemplary embodiment.

Referring now to FIG. 6, central portion 310 of sweep plow 300 may be configured such that the thickness of central portion 310 correlates to the thickness of the trailing edge 235 of seed boot point 234. Accordingly, when sweep plow 300 is attached to seed boot 200, the top surface of seed boot point 234 and central portion 310 are flush with one another. The thickness of central portion 310 may be configured to be thinner than the thickness of wings 320 and 330 to minimize soil disturbance as seed boot 200 is dragged through the soil. Central portion 310 may further be configured to mate tightly with leading edge 232 (covered) for the same reason. Seed boot point 234 may alternatively be configured to mount over leading edge 232, such that a trailing edge 235 and shoulder 237 of seed boot point 234 extends above leading edge 232.

Although particular types of seed boot 200, sweep plow 300, and anchor 340 are shown in FIGS. 1-6, it should be understood that the present invention is applicable to various types of seed boots, sweep plows, and anchors where the sweep plow is configured to be removably coupled to the seed boot.

Many changes and modifications could be made to the invention without departing from the spirit thereof. The scope of these changes will become apparent from the appended claims.

We claim:

1. An agricultural implement adapted to be towed in a forward direction along an axis by a vehicle along an agricultural surface, the implement comprising:
   an implement frame connectable to the vehicle;
   a plurality of shanks mounted to the frame, each shank having a leading edge;
   a plurality of seed boots adapted to be coupled to the plurality of shanks, wherein each seed boot includes:
      a leading edge configured to minimize soil disturbance during operations;
      an anchor hole; and
      a leading surface with a recess formed therein, the recess being defined by a first shoulder; and
   a plurality of universal sweep plows attached to corresponding seed boots, each sweep plow including:
      a sweep plow attachment formed from a single unit of metal, the attachment including:
         a central portion received in the recess of a corresponding seed boot in a mating relationship and including right and left central portion openings configured to align with an anchor hole in the seed boot, an upper edge adjacent the first shoulder in the corresponding seed boot and a lower edge; and
         right and left wings extending outwardly and rearward from the central portion, each wing including a linear leading edge extending along an axis which intersects the corresponding seed boot at a location rearwardly of the leading edge of the corresponding seed boot, a linear trailing edge generally parallel to the leading edge, and a generally V-shaped outer edge interconnecting the leading and trailing edges, the V-shaped outer edge of each wing including;
            a linear trailing outer edge portion projecting from the trailing edge at an obtuse angle thereto; and
            a linear leading outer edge portion projecting from the leading edge, the trailing outer edge portion and the leading outer edge portion intersecting at a wing tip located forwardly of at least a portion of the trailing edge; and
      an anchor configured to attach the sweep plow attachment to the corresponding seed boot, the anchor passing through the right and left central portion openings and the anchor hole in the corresponding seed boot.

2. The agricultural implement of claim 1, wherein the wings extend outwardly from the central portion in a common plane.

3. The agricultural implement of claim 2, wherein a front edge of each wing is relatively lower than a rear edge of each wing such that each sweep plow attachment acts as a soil engagement mechanism during operation.

4. The agricultural implement of claim 1, wherein each wing has a thickness and wherein the thickness of each wing is greater at a location adjacent the central portion relative to the thickness of each wing at a location spaced from the central portion.

5. The agricultural implement of claim 1, wherein each seed hoot includes a seed boot point having a thickness and wherein the lower edge of the central portion of each sweep plow attachment has a thickness, the thickness of each lower edge of the central portion being generally equal to the thickness of a trailing edge of each seed boot point such that each seed boot point, and central portion present a flush surface when the sweep plow attachments are attached to the seed boots.

6. The agricultural implement of claim 1, wherein the central portion of each sweep plow attachment includes an inner surface, the inner surface of each central portion being configured to form a mating relationship with a leading edge of a corresponding seed boot.

7. An agricultural implement, the implement comprising:
   a seed boot including a leading edge configured to minimize soil disturbance during operation and an anchor hole, the seed boot formed to include a pair of spaced-apart shoulders defining a recess therebetween; and
   a universal sweep plow configured to mate securely and be attached to the seed boot, the universal sweep plow including:
      a sweep plow attachment, the attachment including:
         a central portion received in the recess of the seed hoot in a mating relationship, the central portion including right and left central portion openings configured to align with an anchor hole in the seed boot such that at least a portion of the central portion is configured to be positioned between the pair of spaced-apart shoulders, and
         right and left wings extending outwardly and rearward from the central portion, each wing including a linear leading edge extending along an axis which intersects the seed boot at a location rearwardly of the leading edge of the seed boot, a linear trailing edge generally parallel to the leading edge, and a generally V-shaped outer edge interconnecting the leading and trailing edges, the V-shaped outer edge of each wing including:
            a linear trailing outer edge portion projecting from the trailing edge at an obtuse angle thereto; and
            a linear leading outer edge portion projecting from the leading edge, the trailing outer edge portion and the leading outer edge portion intersecting at a wing tip located forwardly of at least a portion of the trailing edge; and an anchor configured to attach the sweep plow to the seed boot by passing through the right and left central portion openings in the central portion of the seed boot attachment and the anchor hole in the seed boot, such that the sweep plow attachment is held securely in place to the seed boot by a combination of the spaced-apart shoulders and anchor connection.

8. The agricultural implement of claim 7, wherein the wings extend outwardly from the central portion in a common plane.

9. The agricultural implement of claim 8, wherein a front edge of each wing is relatively lower than a rear edge of each wing such that the sweep plow acts as a soil engagement mechanism during operation.

10. The agricultural implement of claim 7, wherein each wing has a thickness and wherein the thickness of each wing is greater at a location adjacent the central portion relative to the thickness of each wing at a location spaced from the central portion.

11. The agricultural implement of claim 7, wherein the seed boot includes a seed boot point having a thickness and wherein the central portion of the sweep plow attachment has a thickness, the thickness of the central portion being generally equal to the thickness of a trailing edge of the seed boot point such that the seed boot point and central portion present a flush surface when the sweep plow attachment is attached to the seed boot.

12. The agricultural implement of claim 7, wherein the central portion of the sweep plow attachment includes an inner surface defining the cavity, the inner surface of the central portion being configured to form a mating relationship with the corresponding seed boot surface which includes a leading edge of the seed boot.

13. The agricultural implement of claim 7, wherein at least a portion of the central portion abuts each of the shoulders.

14. The agricultural implement of claim 7, wherein the central portion includes an upper edge abutting a first of the pair of spaced-apart shoulders and a lower edge abutting a second of the pair of spaced-apart shoulders.

15. The agricultural implement of claim 13, wherein the spaced-apart shoulders are configured to discourage pivotal movement oldie sweep plow attachment.

16. An agricultural implement adapted to be towed by a vehicle along an agricultural surface, the implement comprising:

an implement frame connectable to the vehicle;

a plurality of shanks mounted to the frame, each shank having a leading edge;

a plurality of seed boots adapted to be coupled to the plurality of shanks, wherein each seed boot includes a leading edge configured to minimize soil disturbance during operations and an anchor hole, and a recess defined by a recessed surface extending between a pair of spaced-apart shoulders; and a plurality of universal sweep plows attached to the seed boots, each sweep plow including:

a sweep plow attachment formed from a single unit of metal, the attachment including:

a central portion received in the recess and having an inner surface configured to mate with the recessed surface and including right and left central portion openings configured to align with an anchor hole in the seed boot such that at least a portion of the central portion is positioned between the pair of spaced-apart shoulders;

right and left wings extending outwardly and rearward from the central portion, each wing including a linear leading edge extending along an axis which intersects a corresponding seed boot at a location rearwardly of the leading edge of the corresponding seed boot, a linear trailing edge generally parallel to the leading edge, and a generally V-shaped outer edge interconnecting the leading and trailing edges, the V-shaped outer edge of each wing including:

a linear trailing outer edge portion projecting from the trailing edge at an obtuse angle thereto; and a linear leading outer edge portion projecting from the leading edge, the trailing outer edge portion and the leading outer edge portion intersecting at a wing tip located forwardly of at least a portion of the trailing edge; and an anchor configured to attach the sweep plow attachment to the seed boot, the anchor passing through the right and left central portion openings and the anchor hole in the seed boot, such that each sweep plow attachment is held securely to each seed boot by a combination of the spaced-apart shoulders and anchor connection.

17. The agricultural implement of claim 16, wherein the wings extend outwardly from the central portion in a common plane.

18. The agricultural implement of claim 17, wherein a front edge of each wing is relatively lower than a rear edge of each wing such that each sweep plow attachment acts as a soil engagement mechanism during operation.

19. The agricultural implement of claim 16, wherein each wing has a thickness and wherein the thickness of each wing is greater at a location adjacent the central portion relative to the thickness of each wing at a location spaced from the central portion.

20. The agricultural implement of claim 16, wherein each seed boot includes a seed boot point having a thickness and wherein the central portion of each sweep plow attachment has a thickness, the thickness of each central portion being generally equal to the thickness of a trailing edge of each seed boot point such that each seed boot point and central portion present a flush surface when the sweep plow attachments are attached to the seed boots.

21. The agricultural implement of claim 16, wherein the central portion includes at least one sidewall which has an upper edge, and wherein the upper edge of the at least one sidewall abuts one of the spaced-apart shoulders.

22. The agricultural implement of claim 16, wherein the central portion includes at least one sidewall which has a lower edge, and wherein the lower edge of the at least one sidewall abuts one of the spaced-apart shoulders.

23. The agricultural implement of claim 16, wherein the spaced-apart shoulders are configured to discourage pivotal movement of the sweep plow attachment.

* * * * *